(12) United States Patent
Zhao et al.

(10) Patent No.: US 9,900,739 B2
(45) Date of Patent: Feb. 20, 2018

(54) METHOD AND APPARATUS FOR IDENTIFYING A TARGET GEOGRAPHIC AREA

(71) Applicant: Alibaba Group Holding Limited, Grand Cayman (KY)

(72) Inventors: Donghui Zhao, Hangzhou (CN); Guojun Tong, Hangzhou (CN); Kai Wu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/421,529

(22) Filed: Feb. 1, 2017

(65) Prior Publication Data

US 2017/0223495 A1    Aug. 3, 2017

(30) Foreign Application Priority Data

Feb. 2, 2016  (CN) .......................... 2016 1 0074728

(51) Int. Cl.
*H04W 4/02* (2009.01)
*H04W 8/18* (2009.01)
*H04M 1/725* (2006.01)
*H04L 29/06* (2006.01)

(52) U.S. Cl.
CPC ......... *H04W 4/02* (2013.01); *H04M 1/72572* (2013.01); *H04W 8/18* (2013.01); *H04L 67/42* (2013.01)

(58) Field of Classification Search
CPC . H04L 41/0816; H04L 67/22; H04L 41/0886; H04L 47/70; H04L 29/08972; H04L 67/02; H04L 12/2856; H04L 67/18; H04W 4/028; G06Q 10/063
See application file for complete search history.

(56) References Cited

U.S. PATENT DOCUMENTS

| | | |
|---|---|---|
| 7,412,398 B1 | 8/2008 | Bailey |
| 7,640,196 B2 | 12/2009 | Weiss |
| 7,797,188 B2 | 9/2010 | Srivastava |
| 7,831,454 B2 | 11/2010 | Nguyen et al. |
| 7,856,370 B2 | 12/2010 | Katta et al. |
| 7,991,638 B1 | 8/2011 | House et al. |
| 8,068,980 B2 | 11/2011 | O'Clair |
| 8,359,235 B1 | 1/2013 | Santoro et al. |
| 8,938,432 B2 | 1/2015 | Rossmark et al. |
| 9,130,882 B1 * | 9/2015 | Caine .................... H04L 67/02 |
| 9,514,386 B2 | 12/2016 | Scott et al. |
| 2006/0136234 A1 | 6/2006 | Singh |
| 2006/0271280 A1 | 11/2006 | O'Clair |
| 2007/0192347 A1 | 8/2007 | Rossmark et al. |
| 2009/0076888 A1 | 3/2009 | Oster et al. |
| 2009/0083128 A1 | 3/2009 | Siegel |
| 2010/0121680 A1 | 5/2010 | Elam et al. |
| 2010/0185391 A1 | 7/2010 | Lee et al. |

(Continued)

*Primary Examiner* — Nizar Sivji
(74) *Attorney, Agent, or Firm* — James J. DeCarlo; Greenberg Traurig, LLP

(57) ABSTRACT

Embodiments of the disclosure provide a method and apparatus for identifying a target geographic area. In one embodiment, the method comprises acquiring user information associated with a geographic area to be identified; determining characteristic data of the user information; and determining a value parameter of the geographic area to be identified based on the characteristic data.

18 Claims, 9 Drawing Sheets

(56) References Cited

U.S. PATENT DOCUMENTS

| | | |
|---|---|---|
| 2010/0198657 A1 | 8/2010 | Singh |
| 2013/0267249 A1* | 10/2013 | Rosenberg .............. H04L 67/22 |
| | | 455/456.3 |
| 2014/0278768 A1 | 9/2014 | Zenor |
| 2014/0289012 A1* | 9/2014 | Deangelis ............ G06Q 10/063 |
| | | 705/7.32 |
| 2015/0088566 A1 | 3/2015 | Rossmark et al. |
| 2015/0161664 A1 | 6/2015 | Koppelmann |

* cited by examiner

METHOD AND APPARATUS FOR IDENTIFYING A TARGET GEOGRAPHIC AREA

CROSS-REFERENCE TO RELATED APPLICATIONS

This application claims the benefit of priority of Chinese Application No. 201610074728.8, titled "A Method and Apparatus for Identification of Target Geographic Area," filed on Feb. 2, 2016, which is hereby incorporated by reference in its entirety.

BACKGROUND

Field of the Disclosure

The disclosure relates to the field of Internet technology and in particular, to methods and apparatuses for identifying a target geographic area.

Description of Related Art

As urbanization continues to become more prevalent, city construction becomes ever more important. Specifically, providing a more convenient travel environment for city residents via planning and construction is becoming an increasingly important issue.

Typically, a city consists of large and small areas. An area should be evaluated to determine the value of the area if individual areas are to be planned, constructed, or reconstructed. However, current methods for evaluating areas are mainly based on population size, construction state, and social factors within an area. Moreover, evaluation methods are generally based only on these factors.

Taking a business district of a city as an example, using current techniques, the evaluation of the business district is considered from the following three perspectives: (1) population size (including resident population size, working population size, past population size, number of resident households, and number of businesses and public institutions within the area); (2) construction state (including a degree of convenience for public transportation, power supply states, communication devices, financial institutions and the like within the area for residents); and (3) social factors (including analyses of area construction planning; public facilities such as parks, public sports venues, theaters, exhibition halls, etc.; and the overall culture of the local area; etc.). An evaluation result is obtained according to these factors, thereby providing advice for a governmental or business decision or selection.

This current evaluation method is general and subjective and does not fully consider the population factor within an area. Therefore, current techniques cannot completely consider population characteristics and are not accurate or precise.

BRIEF SUMMARY

In view of the aforementioned problems with current techniques, embodiments of the disclosure are introduced to provide methods and apparatuses for identifying a target geographic area that overcome, or at least partly solve, the aforementioned problems.

To solve the above-mentioned problems, the disclosure provides a method for identifying a target geographic area, comprising: acquiring user information associated with a geographic area to be identified; determining characteristic data of the user information; and determining a value parameter of the geographic area to be identified based on the characteristic data.

The disclosure additionally discloses an apparatus including one or more processors and a non-transitory memory storing computer-executable instructions therein that, when executed by the processor, cause the apparatus to acquire user information associated with a geographic area to be identified; determine characteristic data of the user information; and determine a value parameter of the geographic area to be identified based on the characteristic data.

Compared with current techniques, the embodiments of the disclosure provide the following advantages.

First, the disclosed embodiments determine a value parameter of a geographic area to be identified by acquiring user information within the geographic area to be identified and basing a value parameter on characteristic data of the user information. The embodiments then determine whether the geographic area to be identified is a target geographic area, thereby achieving identification of the target geographic area based on user characteristics. The embodiments allow for quantification of an identification method and enable more accurate and standard identifications of the target geographic area.

Second, by respectively determining a travel characteristic parameter of a user, a basic characteristic parameter of a user and a preference characteristic parameter of a user, and by aggregating these parameters, the value parameter of the geographic area to be identified may be obtained, further detailing the characteristic data of the user information and enabling more precise and accurate identification of a target geographic area.

Third, the embodiments of the disclosure utilize big data processing technologies to perform cross checking and integration according to locating information of the user and a vast amount of behavior information of the user in a default platform, so as to accurately analyze characteristics of a traveling population within the geographic area to be identified, provide a value parameter evaluation method based on integrated data of the population, and more accurately analyze the value of the target geographic area. Thus a decision reference can be provided for services such as government city planning and business site selection and the like.

Fourth, by transmitting a query instruction for the value parameter of the geographic area to be identified to a server, the embodiments of the disclosure can obtain the value parameter of the geographic area to be identified returned by the server, facilitating timely querying of the value parameter of the geographic area to be identified by the user and providing a reference for follow-up planning or decision making.

DETAILED DESCRIPTION

To make the aforementioned objects, features, and advantages of the disclosure more obvious and easy to understand, the disclosure is further described below in detail in conjunction with the accompanying figures and the detailed description.

Figure 1:
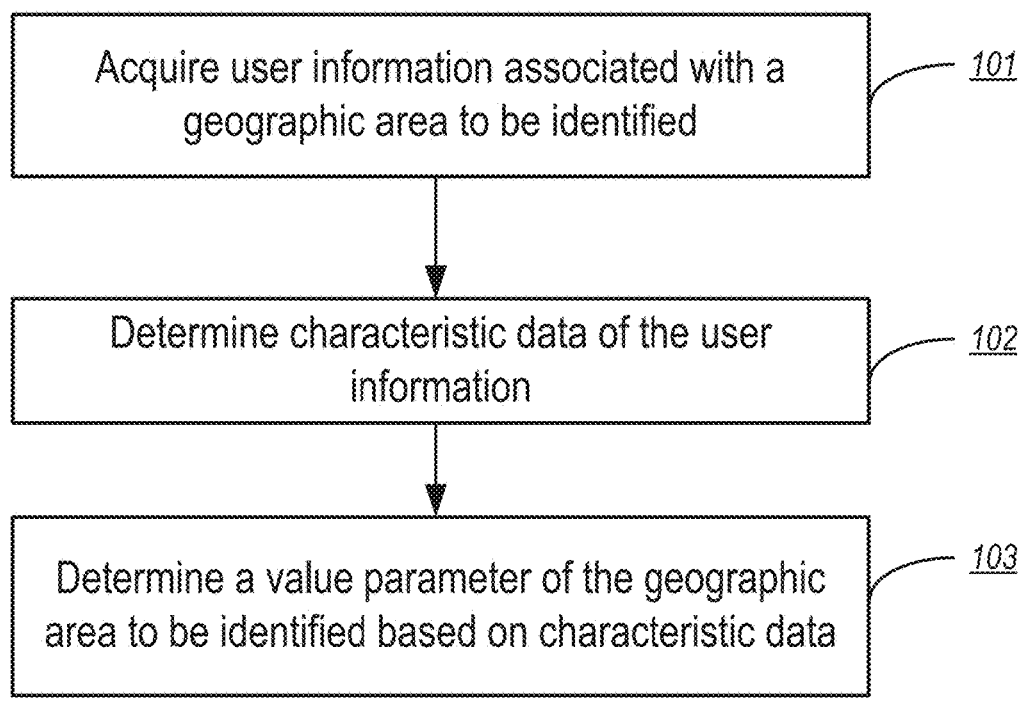
FIG. 1 is a flow diagram illustrating a method for identifying a target geographic area according to some embodiments of the disclosure.

FIG. 1 is a flow diagram illustrating a method for identifying a target geographic area according to some embodiments of the disclosure.

In step 101, the method acquires user information associated with a geographic area to be identified.

In some embodiments, the geographic area to be identified may be a relatively large area (e.g., a certain district of a city or an area within an administrative range of a certain street). Alternatively, or in conjunction with the foregoing, the geographic area may be a relatively small range of area (e.g., a certain business district range or a peripheral area of a city railway station, or even an area of a certain park or a certain amusement park). The size of a geographic area required to be identified may be determined by those skilled in the art according to actual requirements, thus the disclosure is not specifically limited in this regard.

Figure 2:
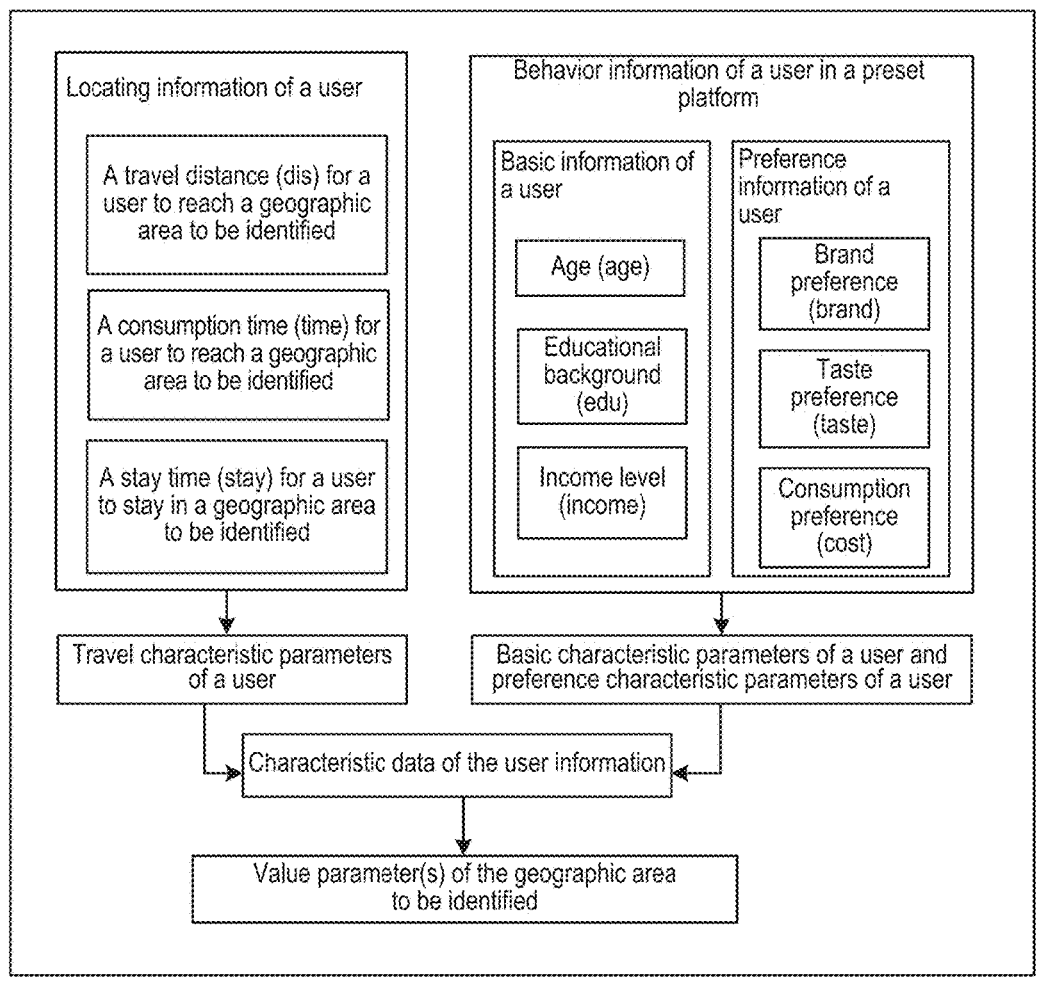
FIG. 2 is a diagram of a user information relationship used to provide a method for identifying a target geographic area according to some embodiments of the disclosure.

FIG. 2 is a diagram of a user information relationship used to provide a method for identifying a target geographic area according to some embodiments of the disclosure. In the illustrated embodiment, the user information may comprise locating information, behavior information in a default platform of the user, or other types of information.

The locating information of the user may represent location information of the user in a particular area, and may generally be obtained by a Location Based Service ("LBS"). An LBS is a value-added service which, with the support of a Geographic Information System (GIS) platform, provides corresponding services for a user by acquiring location information (geographical coordinates or geodetic coordinates) of a mobile terminal user through a radio communication network (e.g., a GSM and/or CDMA network) or an external location mechanism (e.g., GPS).

The behavior information of the user in the default platform may be behavior information of the user on a particular website, for example, TAOBAO.COM. Some consumption habits of the user may be learned by acquiring the behavior information of the user on TAOBAO.COM, including preference information such as a brand preference, a taste preference, and a consumption preference of the user, etc. Additionally, an income level of the user may also be estimated with reference to the consumption habits of the user. In addition, basic information of the user such as age and educational background or the like may be further obtained according to registration information of the user on TAOBAO.COM. Those skilled in the art may select a range of information collected by the default platform for determining the user information according to actual requirements, or may also determine a type of the acquired information depending upon areas to be identified. Thus the disclosure is not specifically limited in this regard.

In one embodiment, before the step of acquiring the user information within the geographic area to be identified, the method may receive a query instruction for a value parameter of the geographic area to be identified from a client.

Figure 3:
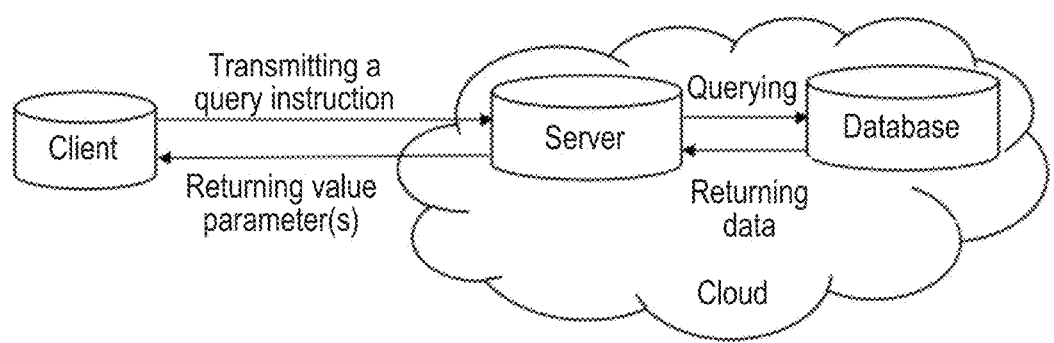
FIG. 3 is a block diagram illustrating interactions between a client and a server implementing a method for identifying a target geographic area according to some embodiments of the disclosure.

FIG. 3 is a block diagram illustrating interactions between a client and a server implementing a method for identifying a target geographic area according to some embodiments of the disclosure. For example, when the public or a government decision making department requests a value parameter of a certain geographic area, a query instruction for the value parameter of the geographic area may be transmitted by a client. In response, a server may determine the value parameter of the geographic area to be identified after receiving the query instruction from the client. In one embodiment, the client may be a query terminal that provides for the querying of the value parameter of the geographic area, and may also be a corresponding application program on a mobile terminal. Those skilled in the art may utilize a specific form of the client according to specific requirements, and the disclosure is not limited in this regard.

In one embodiment, the step of acquiring the user information within the geographic area to be identified may specifically further include the following sub-steps.

Sub-Step 1011:

identify one or more users based on a geographic location within the geographic area to be identified.

Sub-Step 1012:

extract locating information and behavior information in the default platform of the one or more users.

Typically, one or more users reaching the geographic area to be identified may be identified according to LBS data and the location of the geographic area to be identified. Then the locating information and the behavior information in the default platform of the one or more users are extracted according to a user identifier. In one embodiment, the user identifier may be a mobile communication number of the user, or an identity card number of the user, and the disclosure is not limited in this regard.

In step 102, the method determines characteristic data of the user information.

In some embodiments, the characteristic data of the user information may be considered as a reflection of a user's contribution degree for the geographic area to be identified, and may specifically comprise a travel characteristic parameter of the user, a basic characteristic parameter of the user and a preference characteristic parameter of the user.

For example, if the geographic area to be identified is a business district, travel characteristic parameters of the users may be respectively determined based on a length of a stay time for different users to stay in the business district. It is generally recognized that the travel characteristic parameter of a user having a longer stay time should be higher than that of a user having a shorter stay time, because the user having a longer stay time has a greater probability of consumption in the business district than the user having a shorter stay time. The above examples are merely to facilitate a understanding of the embodiments of the disclosure, and should not considered as a limitation to the disclosure, those skilled in the art may select a suitable determination standard depending upon specific types of geographic areas to identified, for example, if the travel characteristic parameter is determined based on the stay time, the characteristic parameter of a user having a longer stay time may also be lower than that of a user having a shorter stay time, thus the disclosure is not specifically limited in this regard.

In step 103, the method determines a value parameter of the geographic area to be identified based on characteristic data. In one embodiment, a value parameter of the to-be-identified geographic area may be considered as an evaluation of the value of the geographic area, and may be a sum of contribution degrees of one or more users, for example, with regard to a certain business district. If the value parameter is higher, it may be considered that the business district has a higher value than other business districts, and is more attractive to users.

Figure 4:
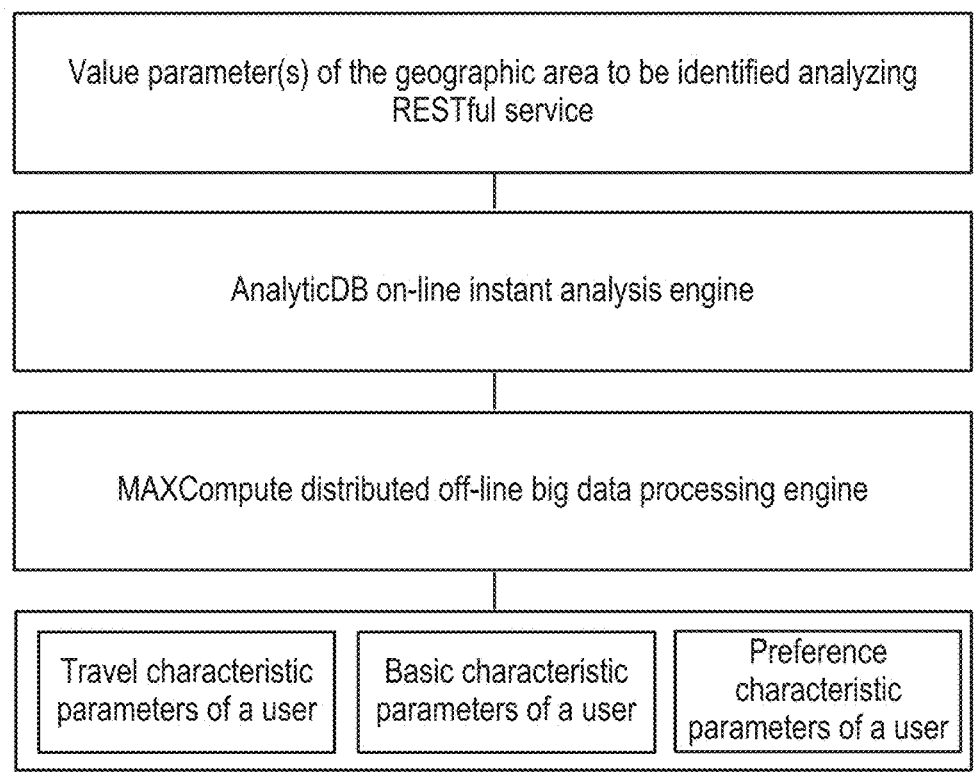
FIG. 4 is a block diagram illustrating a system for identifying a target geographic area according to some embodiments of the disclosure.

FIG. 4 is a block diagram illustrating a system for identifying a target geographic area according to some embodiments of the disclosure. In the illustrated embodiment, the value parameter of the geographic area to be identified may be determined by using characteristic data. In one embodiment, the value parameter of the geographic area to be identified may be obtained by aggregating the characteristic data of the one or more users.

In one embodiment, after determining the value parameter of the geographic area to be identified, the method illustrated in FIG. 1 may additionally determine whether the geographic area to be identified is a target geographic area based on the value parameter. That is, the method in FIG. 1 may further include step 104 wherein the methods determines whether the geographic area to be identified is the target geographic area based on the value parameter.

In one embodiment, the value parameter may be compared with a preset threshold value, and if the value parameter is greater than the preset threshold value, it may be determined that the geographic area to be identified is a target geographic area.

Furthermore, with regard to a plurality of geographic areas to be identified, a value parameter may be determined respectively in accordance with the same standard, and a geographic area with the highest value parameter is determined as the target geographic area.

In some embodiments, a value parameter of the geographic area to be identified is determined by acquiring the user information within the geographic area to be identified and based on the characteristic data of the user information, and then it is determined whether the geographic area to be identified is the target geographic area, thereby achieving identification of the geographic area based on the user characteristics, realizing quantification of an identification method, and enabling more accurate and standard identification of the target geographic area.

Secondly, the embodiments of the disclosure utilize a big data processing technology to perform cross-functional integration according to the locating information of the user and a vast amount of behavior information of the user in a default platform, so as to accurately analyze characteristics of a traveling population within the geographic area to be identified, provide a value parameter evaluation method based on integrated data of the population, and more accurately analyze the value of the target geographic area. Thus a reference for decision-making can be provided for services such as government city planning and business site selection and the like.

Figure 5:
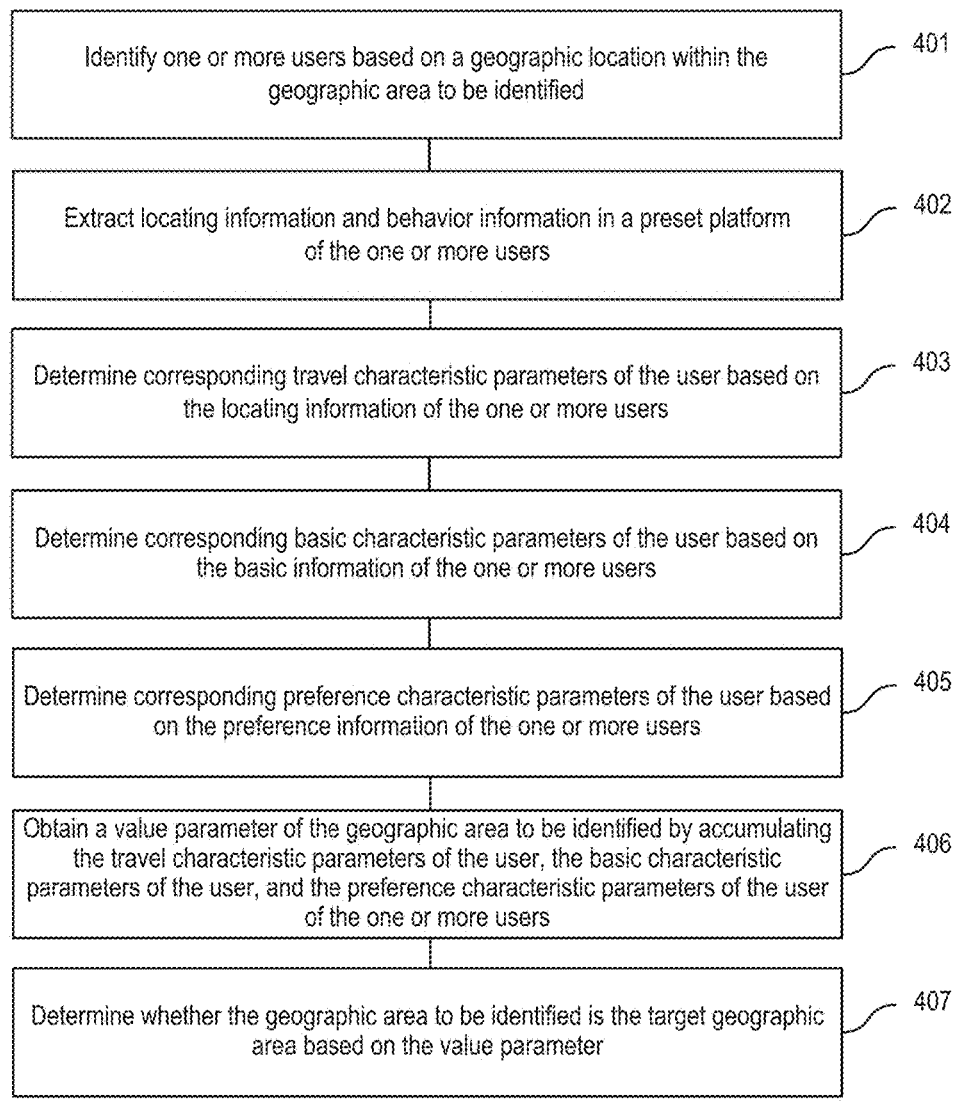
FIG. 5 is a flow diagram illustrating a method for identifying a target geographic area according to some embodiments of the disclosure.

FIG. 5 is a flow diagram illustrating a method for identifying a target geographic area according to some embodiments of the disclosure.

In step 401, the method identifies one or more users based on a geographic location within the geographic area to be identified.

In one embodiment, the location of the user may be obtained based on a radio communication network (e.g., a GSM or CDMA network) or an external locating mechanism (e.g., GPS), so as to determine the one or more users within the geographic area to be identified.

In step 402, the method extracts locating information and behavior information in the default platform of the one or more users.

In some embodiments, the locating information of the one or more users within the geographic area to be identified may be extracted from a LBS service, the locating information may comprise a travel distance (dis) for the user to reach the geographic area to be identified, a consumption time (time) for the user to reach the geographic area to be identified, and a stay time (stay) for the user to stay in the geographic area to be identified.

The behavior information of the user in the default platform may comprise the basic information and the preference information of the user.

Referring to FIG. 2, the basic information of the user may comprise age (age), educational background (edu) and income level (income) or the like, and may be obtained from registration information and real-name authentication information of the user in the default platform. For example, information such as age and educational background or the like of the user may be directly obtained from the registration information and the real-name authentication information after the user has registered on TAOBAO.COM and has completed real-name authentication, and income level of the user may be obtained based on income data reported by the user in the default platform, or a consumption condition of the user on the network may also be analyzed so as to determine income level of the user.

The preference information of the user may comprise a brand preference (brand), a taste preference (taste), and a consumption preference (cost) of the user. The preference information of the user may be obtained by analyzing the consumption condition of the user on the network, and may also be obtained from the registration information of the user in the default platform. For example, for convenience of providing a better service for the user, some e-commerce websites would provide a questionnaire for the user to select information meeting his/her own preferences during user registration.

In step 403, the method determines a corresponding travel characteristic parameter of the user based on the locating information of the one or more users.

In some embodiments, the step of determining the corresponding travel characteristic parameter of the user based on the locating information of the one or more users further comprises determining the corresponding travel characteristic parameter of the user by employing the travel distance for the one or more users to reach the geographic area to be identified, the consumption time for the user to reach the geographic area to be identified, and the stay time for the user to stay in the geographic area to be identified.

In one embodiment, a model, as shown by the following equation, of a user i with respect to a travel characteristic parameter of a user within a geographic area j to be identified may be constructed so as to obtain the travel characteristic parameter of the user, $$ub\_trip_{ij} = [dis_{ij}, time_{ij}, stay_{ij}]$$

where $\text{ub\_trip}_{ij}$ is the travel characteristic parameter of the user.

In step 404, the method determines a corresponding basic characteristic parameter of the user based on the basic information of the one or more users.

In some embodiments, the step of determining the corresponding basic characteristic parameter of the user based on the basic information of the one or more users further comprises determining the corresponding basic characteristic parameter of the user by employing the age, educational background, and income level of the one or more users.

In one embodiment, a model, as shown by the following equation, of the user i with respect to the basic characteristic parameter of the user within the geographic area j to be identified may be constructed so as to obtain the basic characteristic parameter of the user, $$u\_base_i = [age_i, edu_i, income_i]$$

where $u\_base_i$ is the basic characteristic parameter of the user.

In step 405, the method determines a corresponding preference characteristic parameter of the user based on the preference information of the one or more users.

In some embodiments, the step of determining the corresponding preference characteristic parameter of the user based on the preference information of the one or more users further comprises determining the corresponding preference characteristic parameter of the user by employing the brand preference, the taste preference, and the consumption preference of the one or more users.

In one embodiment, a model, as shown by the following equation, of the user i with respect to the preference characteristic parameter of the user within the geographic area j to be identified may be constructed so as to obtain the preference characteristic parameter of the user, $$u\_pre_i = [brand_i, taste_i, cost_i]$$

where $u\_pre_i$ is the preference characteristic parameter of the user.

In step 406, the method obtains a value parameter of the geographic area to be identified by aggregating the travel characteristic parameter of the user, the basic characteristic parameter of the user, and the preference characteristic parameter of the user of the one or more users.

In some embodiments, the step of obtaining the value parameter of the geographic area to be identified by aggregating the characteristic data of the one or more users further comprises obtaining the value parameter of the geographic area to be identified by aggregating the travel characteristic parameter of the user, the basic characteristic parameter of the user, and the preference characteristic parameter of the user of the one or more users.

In one embodiment, the travel characteristic parameter of the user, the basic characteristic parameter of the user, and the preference characteristic parameter of the user that are obtained in steps 403 to 405 may be used to construct a model of the characteristic data of the user information as shown below, $$ub_{ij} = \begin{cases} [dis_{ij}, time_{ij}, stay_{ij}, age_i, edu_i, income_i, brand_i, taste_i, cost_i] \\ [0, 0, 0, 0, 0, 0, 0, 0, 0] \end{cases}$$

where $ub_{ij}$ is the characteristic data of the user information, in the model. The first line indicates that the user i is within the geographic area j to be identified, while the second line indicates that the user i is not within the geographic area to be identified.

Then, it may be known that all users within the geographic area j to be identified are as follows:

$$b_j = \{ub_{ij} | i=1 \ldots n\}$$

Further, it may be obtained that a model of the value parameter of the geographic area to be identified is as follows:

$$BValue(b_j) = \sum_{i=1}^{n} Pvalue(ub_{ij})$$

where, $BValue(b_j)$ is the value parameter of the geographic area to be identified, $Pvalue(ub_{ij})$ is the characteristic data of the user i within the range of the geographic area to be identified with respect to the geographic area j to be identified.

In an embodiment of the disclosure, the model of the value parameter of the geographic area to be identified may be also converted to a linear model, that is:

$$Pvalue(ub_{ij}) = k_0 + k_1 \times dis_{ij} + k_2 \times time_{ij} + k_3 \times stay_{ij} + k_4 \times age_i + k_5 \times edu_i + k_6 \times income_i + k_7 \times brand_i + k_8 \times taste_i + k_9 \times \cos t_i$$

Therefore, the equation for determining the value parameter of the geographic area to be identified may be further obtained, as shown by the following equation:

$$BValue(b_j) = num_j \times k_0 + k_1 \times \sum_{i=1}^{num_j} dis_{ij} + k_2 \times \sum_{i=1}^{num_j} time_{ij} + k_3 \times \sum_{i=1}^{num_j} stay_{ij} + k_4 \times \sum_{i=1}^{num_j} age_i + k_5 \times \sum_{i=1}^{num_j} edu_i + k_6 \times \sum_{i=1}^{num_j} income_i + k_7 \times \sum_{i=1}^{num_j} brand_i + k_8 \times \sum_{i=1}^{num_j} taste_i + k_9 \times \sum_{i=1}^{num_j} cost_i$$

Then, the aforementioned equation may be trained by a linear regression model according to a plurality of geographic areas with the value parameter determined, so as to determine parameters, ($k_0, \ldots k_9$) such that the value parameter may be determined directly by employing the aforementioned equation after the user information within the geographic area to be identified is obtained.

In step 407, the method determines whether the geographic area to be identified is the target geographic area based on the value parameter.

In some embodiments, by respectively determining the travel characteristic parameter of the user, the basic characteristic parameter of the user and the preference characteristic parameter of the user, and then aggregating the travel characteristic parameter of the user, the basic characteristic parameter of the user and the preference characteristic parameter of the user of one or more users, the value parameter of the geographic area to be identified is obtained, further detailing the characteristic data of the user information and enabling more precise and accurate identification of the target geographic area.

Secondly, in some embodiments, the model of the value parameter may also be constructed such that the value parameter may be determined directly by employing the model after the user information is obtained, simplifying the step of identifying the target geographic area.

Figure 6:
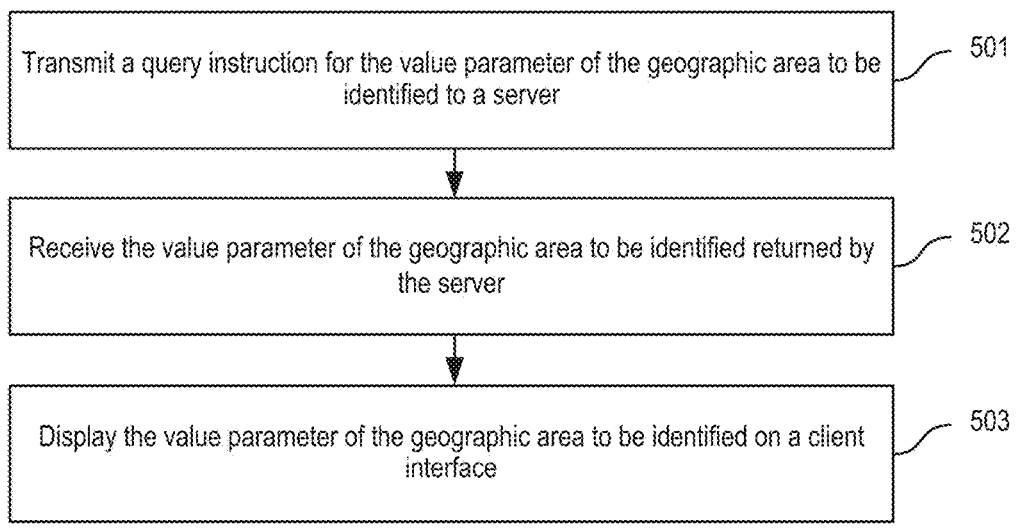
FIG. 6 is a flow diagram illustrating a method for identifying a target geographic area according to some embodiments of the disclosure.

FIG. 6 is a flow diagram illustrating a method for identifying a target geographic area according to some embodiments of the disclosure.

In step 501, the method transmits a query instruction for the value parameter of the geographic area to be identified to a server. In some embodiments, when the public or the government department needs to learn a value parameter of a certain geographic area, a query instruction for the geographic area may be transmitted to a server.

Figure 7:
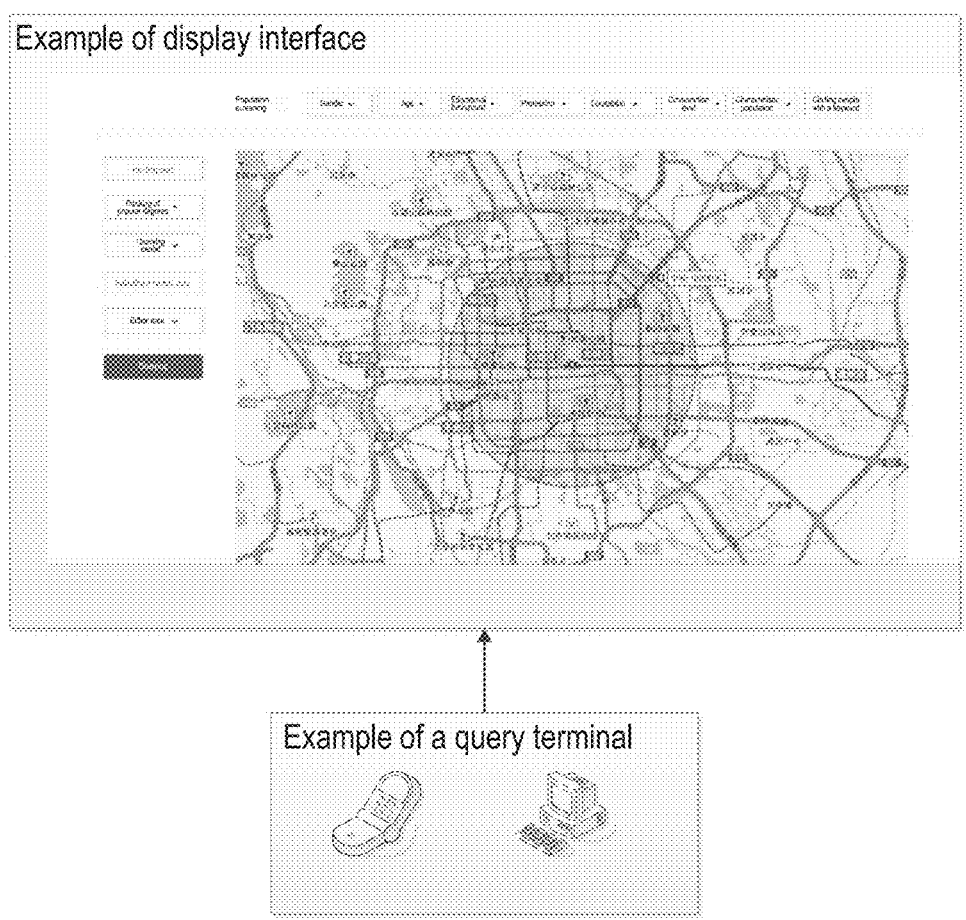
FIG. 7 is a block diagram illustrating a query terminal interface for identifying a target geographic area according to some embodiments of the disclosure.

FIG. 7 is a block diagram illustrating a query terminal interface for identifying a target geographic area according to some embodiments of the disclosure. In one embodiment, the query instruction may be transmitted not only by a corresponding query terminal, but also by a mobile terminal via a corresponding application program. Those skilled in the art may determine a specific way for transmitting the query instruction according to specific requirements, and the disclosure is not limited in this regard.

In step 502, the method receives the value parameter of the geographic area to be identified returned by the server.

In some embodiments, the server may, after reception of the query instruction, determine the value parameter of the geographic area to be identified for the query instruction, and then return the value parameter to a query terminal.

In step 503, the method displays the value parameter of the geographic area to be identified on a client interface.

In some embodiments, when the value parameter of the geographic area to be identified returned by the server is received, the value parameter may be further displayed on the client interface, so that an inquirer intuitively obtains the value parameter of the geographic area. Specifically, the client may be a query terminal that provides for the querying of the value parameter of the geographic area, and may also be a corresponding application program on a mobile terminal. Those skilled in the art may determine a specific form of the client according to specific requirements, thus the disclosure is not limited in this regard.

Specifically, the value parameter may be obtained by the server in the following manners: acquiring user information within a geographic area to be identified; determining characteristic data of the user information; and determining a value parameter of the geographic area to be identified by employing the characteristic data.

In some embodiments, the user information may comprise locating information, and behavior information in a default platform of the user, the step of acquiring the user information within the geographic area to be identified comprises: determining one or more users based on a geographic location within the geographic area to be identified; and extracting locating information, and behavior information in the default platform of the one or more users.

In some embodiments, the behavior information in the default platform may comprise: basic information and preference information of the user, the characteristic data of the user information comprises a travel characteristic parameter of the user, a basic characteristic parameter of the user, and a preference characteristic parameter of the user.

Accordingly, the step of determining the characteristic data of the user information may comprise the following steps: determining a corresponding travel characteristic parameter of the user based on the locating information of the one or more users; determining a corresponding basic characteristic parameter of the user based on the basic information of the one or more users; and determining a corresponding preference characteristic parameter of the user based on the preference information of the one or more users.

In some embodiments, the step of determining the value parameter of the geographic area to be identified by employing the characteristic data may comprise obtaining the value parameter of the geographic area to be identified by aggregating the characteristic data of the one or more users.

It should be illustrated that, with regard to the method embodiments, all of them are expressed as a combination of a series of acts for simplicity of description, but those skilled in the art will recognize that the embodiments of the disclosure are not limited by the described order of acts, as some steps may, in accordance with the embodiments of the disclosure, be carried out in other orders or simultaneously. Secondly, those skilled in the art should also appreciate that the embodiments described in the Description belong to the preferred embodiments and that the involved acts are not necessarily required by the disclosure.

Figure 8:
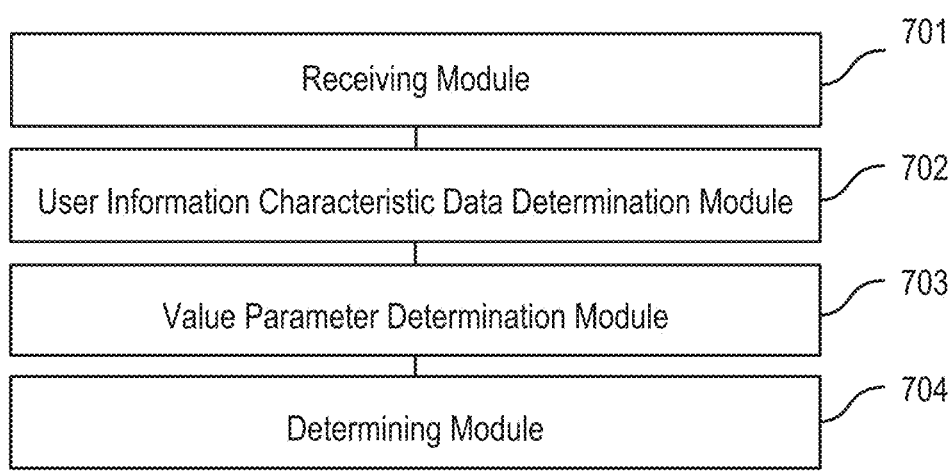
FIG. 8 is a block diagram of an apparatus for identifying a target geographic area according to some embodiments of the disclosure.

FIG. 8 is a block diagram of an apparatus for identifying a target geographic area according to some embodiments of the disclosure, which may specifically comprise the following modules.

An acquisition module 701 for acquiring user information within a geographic area to be identified.

A user information characteristic data determination module 702 for determining characteristic data of the user information.

A value parameter determination module 703 for determining a value parameter of the geographic area to be identified by employing the characteristic data.

A judgment module 704 for judging whether the geographic area to be identified is a target geographic area based on the value parameter.

In some embodiments, the user information may comprise locating information, and behavior information in a default platform of the user, the acquisition module 701 may specifically comprise the following submodules: a determination submodule 7011 for determining one or more users based on the geographic location within the geographic area to be identified; and an extraction submodule 7012 for extracting locating information, and behavior information in the default platform of the one or more users.

In some embodiments, the behavior information in the default platform may comprise: basic information and preference information of the user, and the characteristic data of the user information may comprise: a travel characteristic parameter of the user, a basic characteristic parameter of the user, and a preference characteristic parameter of the user. In this embodiment, the user information characteristic data determination module 702 may specifically comprise the following submodules: a travel characteristic parameter determination submodule 7021 for determining a corresponding travel characteristic parameter of the user based on the locating information of the one or more users; a basic characteristic parameter determination submodule 7022 for determining a corresponding basic characteristic parameter of the user based on the basic information of the one or more users; and a preference characteristic parameter determination submodule 7023 for determining a corresponding preference characteristic parameter of the user based on the preference information of the one or more users.

In some embodiments, the locating information of the user may comprise a travel distance for the user to reach the geographic area to be identified, a consumption time for the user to reach the geographic area to be identified, and a stay time for the user to stay in the geographic area to be identified; the travel characteristic parameter determination submodule 7021 may include a travel characteristic parameter determination unit 21A for determining the corresponding travel characteristic parameter of the user by employing the travel distance for the one or more users to reach the geographic area to be identified, the consumption time for the user to reach the geographic area to be identified, and the stay time for the user to stay in the geographic area to be identified.

In some embodiments, the basic information of the user may comprise age, educational background, and income level of the user; the basic characteristic parameter determination submodule 7022 may include a basic characteristic parameter determination unit 22A for determining the corresponding basic characteristic parameter of the user by employing age, educational background and income level of the one or more users.

In some embodiments, the preference information of the user may comprise a brand preference, a taste preference, and a consumption preference of the user; the preference characteristic parameter determination submodule 7023 may include a preference characteristic parameter determination unit 23A for determining the corresponding preference characteristic parameter of the user by employing the brand preference, the taste preference, and the consumption preference of the one or more users.

In some embodiments, the value parameter determination module 703 may include a value parameter determination submodule 7031 for obtaining the value parameter of the geographic area to be identified by aggregating the characteristic data of the one or more users.

In some embodiments, the value parameter determination submodule 7031 may include a value parameter determination unit 31A for obtaining the value parameter of the geographic area to be identified by aggregating the travel characteristic parameter of the user, the basic characteristic parameter of the user, and the preference characteristic parameter of the user of the one or more users.

In one embodiment, the apparatus may include a determining module 704 for judging whether the geographic area to be identified is a target geographic area based on the value parameter.

In some embodiments, the judgment module 704 may include a judgment submodule 7041 for comparing the value parameter with a preset threshold value, and if the value parameter is greater than the preset threshold value, judging that the geographic area to be identified is the target geographic area.

In some embodiments, the apparatus may further include a reception module for receiving a query instruction for the value parameter of the geographic area to be identified from the client.

Figure 9:
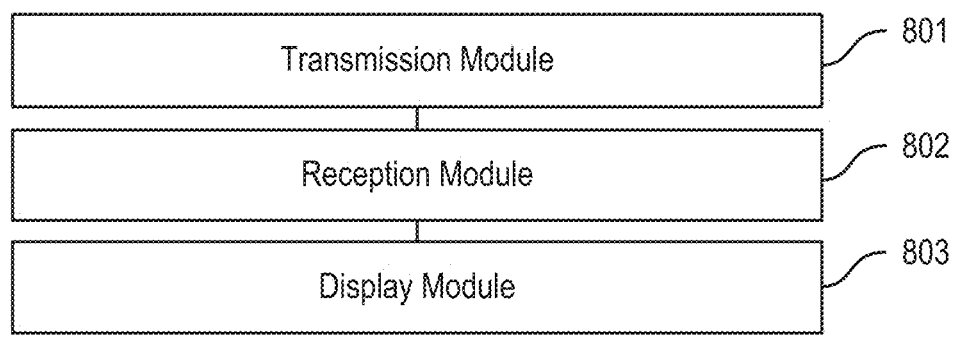
FIG. 9 is a block diagram of an apparatus for identifying a target geographic area according to some embodiments of the disclosure.

FIG. 9 is a block diagram of an apparatus for identifying a target geographic area according to some embodiments of the disclosure, which may include a transmission module 801 for transmitting a query instruction for the value parameter of the geographic area to be identified to a server; and a reception module 802 for receiving the value parameter of the geographic area to be identified returned by the server. In some embodiments, the apparatus may further include a display module 803 for displaying the value parameter of the geographic area to be identified on a client interface.

The value parameter may be obtained by the server via the following modules: an acquisition module for obtaining user information within a geographic area to be identified; a user information characteristic data determination module for determining characteristic data of the user information; and a value parameter determination module for determining a value parameter of the geographic area to be identified by employing the characteristic data.

In some embodiments, the user information may comprise locating information, and behavior information in a default platform of the user, the acquisition module may comprise the following submodules: a determination submodule for determining one or more users based on a geographic location within the geographic area to be identified; and an extraction submodule for extracting locating information, and behavior information in the default platform of the one or more users.

In some embodiments, the behavior information in the default platform may comprise: basic information and preference information of the user, the characteristic data of the user information comprising a travel characteristic parameter of the user, a basic characteristic parameter of the user, and a preference characteristic parameter of the user. In this embodiment, the user information characteristic determination module may include a travel characteristic parameter determination submodule for determining a corresponding travel characteristic parameter of the user based on the locating information of the one or more users; a basic characteristic parameter determination submodule for determining a corresponding basic characteristic parameter of the user based on the basic information of the one or more users; and a preference characteristic parameter determination submodule for determining a corresponding preference characteristic parameter of the user based on the preference information of the one or more users.

In some embodiments, the value parameter determination module may include a value parameter determination submodule for obtaining the value parameter of the geographic area to be identified by aggregating the characteristic data of the one or more users.

In terms of the apparatus embodiments, since the apparatus embodiments are substantially similar to the method embodiments, the description is relatively simple, and reference can be made to the description of the method embodiments for related parts.

Each embodiment in the present specification is described in a progressive manner, with each embodiment focusing on parts different from other embodiments, and reference can be made to each other for identical and similar parts among various embodiments.

It should be understood by those skilled in the art that embodiments of the disclosure may be provided as a method, an apparatus, or a computer program product. Thus, embodiments of the disclosure may employ the form of a fully hardware embodiment, a fully software embodiment, or an embodiment combining software and hardware aspects. Moreover, embodiments of the disclosure may employ the form of a computer program product implemented on one or more computer usable storage media (including but not limited to a magnetic disk memory, CD-ROM, an optical memory, etc.) containing computer usable program code therein.

In a typical configuration, the computer device comprises one or more processors (CPUs), input/output interfaces, network interfaces and memories. The memory may comprise computer readable medium in the form of non-permanent memory, random access memory (RAM) and/or non-volatile memory or the like, such as read-only memory (ROM) or flash memory (flash RAM). The memory is an example of a computer readable medium. The computer-readable medium includes permanent and non-permanent, movable and non-movable media that can achieve information storage by means of any methods or techniques. The information may be computer-readable instructions, data structures, modules of programs or other data. Examples of storage medium for a computer include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In light of the definitions herein, the computer readable medium does not include non-persistent computer readable media, such as modulated data signals and carrier waves.

Embodiments of the disclosure are described with reference to a flow diagram and/or block diagram of a method, terminal device (system), and computer program product according to an embodiment of the disclosure. It should be understood that, a combination of each flow and/or block of the flow diagrams and/or the block diagrams, and a flow and/or a block of the flow diagrams and/or the block diagrams can be implemented by computer program instructions. These computer program instructions may be provided to a processor of a general purpose computer, a special purpose computer, an embedded processor, or other programmable data processing terminal device to produce a machine such that instructions performed by a processor of a computer or other programmable data processing terminal device generate means for implementing a function specified in one or more flows of the flow diagrams and/or one or more blocks of the block diagrams.

These computer program instructions may also be stored in a computer readable memory that can direct a computer or other programmable data processing terminal device to operate in a particular manner, such that the instructions stored in the computer readable memory produce an article of manufacture comprising instruction means, the instruction means implementing the functions specified in one or more flows of the flow diagrams and/or one or more blocks of the block diagrams.

These computer program instructions may also be loaded onto a computer or other programmable data processing terminal device such that a series of operational steps are performed on a computer or other programmable terminal device to produce a computer-implemented processing, and thus the instructions performed on a computer or other programmable terminal devices provide the steps for implementing the functions specified in one or more flows of the flow diagrams and/or one or more blocks of the block diagrams.

Although some embodiments have been described, those skilled in the art may make other alterations and modifications to these embodiments as soon as they become aware of the basic inventive concepts. Therefore, it is intended that the appended Claims are interpreted as including preferred embodiments and all changes and modifications falling within the scope of the embodiments.

Finally, it should also be noted that relational terms such as first and second are used herein only to distinguish one entity or operation from another entity or operation without necessarily requiring or implying that there are these actual relations or orders between the entity or operations. Furthermore, the terms "comprising," "including," or any other variation thereof are intended to encompass a non-exclusive inclusion so that a process, method, article, or terminal device that includes a series of elements includes not only those elements but also other elements not explicitly listed, but also elements that are inherent to such a process, method, article, or terminal device. The element defined by the statement "comprising one . . . ", without further limitation, does not preclude the presence of additional identical elements in the process, method, article, or terminal device that includes the element.

Hereinbefore, a method and apparatus for identifying a target geographic area provided by the disclosure is introduced in detail, the principles and embodiments of the disclosure are set forth in the disclosure with reference to specific examples, descriptions of the above embodiments are merely served to assist in understanding the method and essential ideas of the disclosure; and to a person of ordinary skill in the art, changes may be made to specific embodiments and application scopes according to the spirit of the disclosure, as described above, the present disclosure should not be construed as limiting the disclosure.

What is claimed is:

1. A method comprising:
identifying one or more users based on a geographic location within a geographic area to be identified and based on locations of the one or more users obtained from at least one location-based service;
acquiring user information associated with the geographic area to be identified, the user information representing the one or more users;
extracting, from the user information, locating information and behavior information associated with the one or more users;
constructing a model representing characteristic data of the user information; and
determining a value parameter of the geographic area to be identified based on the model.

2. The method of claim 1, wherein the behavior information includes basic information and preference information, wherein the characteristic data comprises travel characteristic parameters, basic characteristic parameters, and preference characteristic parameters, and wherein determining characteristic data of the user information comprises:
determining a travel characteristic parameter of a user based on locating information associated with the user;
determining a basic characteristic parameter of the user based on the basic information associated with the user; and
determining a preference characteristic parameter of the user based on the preference information associated with the user.

3. The method of claim 2, wherein basic information comprises an age, educational background, and income level information and wherein the preference information comprises brand, taste and consumption preference information.

4. The method of claim 3, wherein determining the value parameter of the geographic area to be identified comprises obtaining the value parameter of the geographic area to be identified by aggregating the characteristic data of the one or more users.

5. The method of claim 4, wherein obtaining the value parameter of the geographic area to be identified by aggregating the characteristic data of the one or more users comprises aggregating travel characteristic parameters of the one or more users, basic characteristic parameters of the one or more users, and preference characteristic parameters of the one or more users.

6. The method of claim 1, further comprising determining whether the geographic area to be identified is a target geographic area based on the value parameter.

7. The method of claim 6, wherein determining whether the geographic area to be identified is a target geographic area based on the value parameter comprises comparing the value parameter with a preset threshold value, and if the value parameter is greater than the preset threshold value, determining that the geographic area to be identified is the target geographic area.

8. The method of claim 1, further comprising receiving a query instruction requesting the value parameter of the geographic area to be identified from a client device.

9. The method of claim 8, further comprising transmitting the value parameter of the geographic area to be identified to the client device, wherein transmitting the value parameter of the geographic area to be identified causes the display of the value parameter of the geographic area to be identified on an interface of the client device.

10. A apparatus comprising:
one or more processors; and
a non-transitory memory storing computer-executable instructions therein that, when executed by the processor, cause the apparatus to:
identifying one or more users based on a geographic location within a geographic area to be identified and based on locations of the one or more users obtained from at least one location-based service;
acquire user information associated with the geographic area to be identified, the user information representing the one or more users;
extract, from the user information, locating information and behavior information associated with the one or more users;
construct a model representing characteristic data of the user information; and
determine a value parameter of the geographic area to be identified based on the model data.

11. The apparatus of claim 10, wherein the behavior information includes basic information and preference information, wherein the characteristic data comprises travel characteristic parameters, basic characteristic parameters, and preference characteristic parameters, and wherein the instructions causing the apparatus to determine characteristic data of the user information further include instructions causing the apparatus to:
determine a travel characteristic parameter of a user based on locating information associated with the user;
determine a basic characteristic parameter of the user based on the basic information associated with the user; and
determine a preference characteristic parameter of the user based on the preference information associated with the user.

12. The apparatus of claim 11, wherein basic information comprises an age, educational background, and income level information and wherein the preference information comprises brand, taste and consumption preference information.

13. The apparatus of claim 12, wherein the instructions causing the apparatus to determine the value parameter of the geographic area to be identified further include instructions causing the apparatus to obtain the value parameter of the geographic area to be identified by aggregating the characteristic data of the one or more users.

14. The apparatus of claim 13, wherein the instructions causing the apparatus to obtain the value parameter of the geographic area to be identified by aggregating the characteristic data of the one or more users further include instructions causing the apparatus to aggregate travel characteristic parameters of the one or more users, basic characteristic parameters of the one or more users, and preference characteristic parameters of the one or more users.

15. The apparatus of claim 10, wherein the instructions further cause the apparatus to determine whether the geographic area to be identified is a target geographic area based on the value parameter.

16. The apparatus of claim 15, wherein the instructions causing the apparatus to determine whether the geographic area to be identified is a target geographic area based on the value parameter further include instructions causing the apparatus to compare the value parameter with a preset threshold value, and if the value parameter is greater than the preset threshold value, determining that the geographic area to be identified is the target geographic area.

17. The apparatus of claim 10, wherein the instructions further cause the apparatus to receive a query instruction requesting the value parameter of the geographic area to be identified from a client device.

18. The apparatus of claim 17, wherein the instructions further cause the apparatus to transmit the value parameter of the geographic area to be identified to the client device, wherein transmitting the value parameter of the geographic area to be identified causes the display of the value parameter of the geographic area to be identified on an interface of the client device.

* * * * *